(12) United States Patent
Glover et al.

(10) Patent No.: US 10,161,428 B2
(45) Date of Patent: *Dec. 25, 2018

(54) USE OF TREATING ELEMENTS TO FACILITATE FLOW IN VESSELS

(71) Applicant: CRYSTAPHASE PRODUCTS, INC., Houston, TX (US)

(72) Inventors: John N. Glover, Houston, TX (US); Peter Gregory Ham, Houston, TX (US); Austin Schneider, Humble, TX (US)

(73) Assignee: CRYSTAPHASE PRODUCTS, INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/720,751

(22) Filed: Sep. 29, 2017

(65) Prior Publication Data

US 2018/0023598 A1 Jan. 25, 2018

Related U.S. Application Data

(63) Continuation of application No. 15/676,603, filed on Aug. 14, 2017, which is a continuation of application No. 15/265,405, filed on Sep. 14, 2016, now Pat. No. 9,732,774.

(60) Provisional application No. 62/294,768, filed on Feb. 12, 2016, provisional application No. 62/314,069, filed on Mar. 28, 2016.

(51) Int. Cl.
*B01J 19/30* (2006.01)
*B01J 8/04* (2006.01)
*F15D 1/00* (2006.01)

(52) U.S. Cl.
CPC .................. *F15D 1/00* (2013.01); *B01J 8/04* (2013.01); *B01J 8/0453* (2013.01); *B01J 19/30* (2013.01); *B01J 2208/0084* (2013.01); *B01J 2208/00938* (2013.01); *B01J 2208/025* (2013.01); *B01J 2208/027* (2013.01); *B01J 2219/30207* (2013.01); *B01J 2219/30211* (2013.01); *B01J 2219/30296* (2013.01); *B01J 2219/30416* (2013.01); *B01J 2219/315* (2013.01)

(58) Field of Classification Search
CPC ........ B01J 19/30; B01J 8/04; B01J 2208/027; B01J 2219/30416; F15D 1/00
See application file for complete search history.

(56) References Cited

U.S. PATENT DOCUMENTS

| 436,414 | A | 9/1890 | Graham |
|---|---|---|---|
| 578,548 | A | 3/1897 | Deruelle |
| 598,351 | A | 2/1898 | Staub |
| 1,947,777 | A | 2/1934 | Huff et al. |
| 2,183,657 | A | 12/1939 | Page |
| 2,212,932 | A | 8/1940 | Fairlie |
| 2,571,958 | A | 10/1951 | Slaughter et al. |
| 2,739,118 | A | 3/1956 | Comte |
| 2,919,981 | A | 1/1960 | Calva |
| 2,985,589 | A | 5/1961 | Broughton et al. |
| 3,090,094 | A | 5/1963 | Schwartzwalder et al. |
| 3,151,187 | A | 9/1964 | Comte |
| 3,169,839 | A | 2/1965 | Calva |
| 3,208,833 | A | 9/1965 | Carson |
| 3,214,247 | A | 10/1965 | Broughton |
| 3,361,839 | A | 1/1968 | Lester |
| 3,423,185 | A | 1/1969 | Ballard et al. |
| 3,431,082 | A | 3/1969 | Sellin |
| 3,489,529 | A | 1/1970 | Dudych et al. |
| 3,498,755 | A | 3/1970 | Borre |
| 3,506,248 | A | 4/1970 | Starbuck et al. |
| 3,635,943 | A | 1/1972 | Stewart |
| 3,685,971 | A | 8/1972 | Carson |
| 3,706,812 | A | 12/1972 | Derosset et al. |
| 3,732,078 | A | 5/1973 | Kassarjian |
| 3,787,188 | A | 1/1974 | Lyon |
| 3,787,189 | A | 1/1974 | Lovell et al. |
| 3,789,989 | A | 2/1974 | Carson |
| 3,844,936 | A | 10/1974 | Newson |
| 3,888,633 | A | 6/1975 | Grosboll et al. |
| 3,898,180 | A | 8/1975 | Crooks et al. |
| 3,947,347 | A | 3/1976 | Mitchell |
| 3,960,508 | A | 6/1976 | Bessant et al. |

(Continued)

FOREIGN PATENT DOCUMENTS

| CA | 2019928 | 12/1991 |
|---|---|---|
| DE | 585595 | 10/1933 |

(Continued)

OTHER PUBLICATIONS

European Patent Office; PCT International Search Report, Issued in Connection to PCT/US2017/017398; 5 pages; Europe.

(Continued)

*Primary Examiner* — Robert D. Harlan
(74) *Attorney, Agent, or Firm* — Greenberg Traurig LLP (57) ABSTRACT

A method for facilitating the distribution of the flow of one or more streams within a bed vessel is provided. Disposed within the bed vessel are internal materials and structures including multiple operating zones. One type of operating zone can be a processing zone composed of one or more beds of solid processing material. Another type of operating zone can be a treating zone. Treating zones can facilitate the distribution of the one or more streams fed to processing zones. The distribution can facilitate contact between the feed streams and the processing materials contained in the processing zones.

28 Claims, 7 Drawing Sheets

(56) References Cited

U.S. PATENT DOCUMENTS

| | | | |
|---|---|---|---|
| 3,992,282 A | 11/1976 | Grosboll et al. | |
| 4,033,727 A | 7/1977 | Vautrain | |
| 4,149,862 A | 4/1979 | Sewell, Sr. | |
| 4,197,205 A | 4/1980 | Hirs | |
| 4,285,910 A | 8/1981 | Kennedy, Jr. | |
| 4,329,318 A | 5/1982 | Le Grouyellec et al. | |
| 4,342,643 A | 8/1982 | Kyan | |
| 4,374,020 A | 2/1983 | Trevino et al. | |
| 4,378,292 A | 3/1983 | Haase | |
| 4,380,529 A | 4/1983 | Gupta | |
| 4,402,832 A | 9/1983 | Gerhold | |
| 4,478,721 A | 10/1984 | Gerhold | |
| 4,568,595 A | 2/1986 | Morris | |
| 4,579,647 A | 4/1986 | Smith | |
| 4,615,796 A | 10/1986 | Kramer | |
| 4,642,397 A | 2/1987 | Zinnen et al. | |
| 4,669,890 A * | 6/1987 | Peyrot | B01J 8/0492 208/146 |
| 4,681,674 A | 7/1987 | Graven et al. | |
| 4,691,031 A | 9/1987 | Suciu et al. | |
| 4,708,852 A | 11/1987 | Helbling, Jr. | |
| 4,775,460 A | 10/1988 | Reno | |
| 4,788,040 A | 11/1988 | Campagnolo et al. | |
| 4,830,736 A | 5/1989 | Hung et al. | |
| 4,938,422 A | 7/1990 | Koves | |
| 4,968,651 A | 11/1990 | Crabtree | |
| 4,971,771 A | 11/1990 | Stahl | |
| 4,985,211 A | 1/1991 | Akiyama et al. | |
| 5,013,426 A | 5/1991 | Dang Vu et al. | |
| 5,017,542 A | 5/1991 | Martan et al. | |
| 5,143,700 A | 9/1992 | Anguil | |
| 5,177,961 A | 1/1993 | Whittenberger | |
| 5,202,097 A | 4/1993 | Poussin | |
| 5,217,603 A | 6/1993 | Inouse et al. | |
| 5,298,226 A | 3/1994 | Nowobilski | |
| 5,304,423 A | 4/1994 | Niknafs et al. | |
| 5,326,512 A | 7/1994 | Stillwagon et al. | |
| 5,336,656 A | 8/1994 | Campbell | |
| 5,368,722 A | 11/1994 | Bartholdy | |
| 5,384,300 A | 1/1995 | Feeley et al. | |
| 5,399,535 A | 3/1995 | Whitman | |
| 5,512,530 A | 4/1996 | Gerdes et al. | |
| 5,523,503 A | 6/1996 | Funk et al. | |
| 5,624,547 A | 4/1997 | Sudhaker et al. | |
| D381,394 S | 7/1997 | Lex, Jr. et al. | |
| 5,660,715 A | 8/1997 | Trimble et al. | |
| 5,910,241 A | 6/1999 | McNamara et al. | |
| 5,972,214 A | 10/1999 | Callebert et al. | |
| 6,024,871 A | 2/2000 | Harter et al. | |
| 6,156,197 A | 12/2000 | Dessapt et al. | |
| 6,258,900 B1 | 7/2001 | Glover | |
| 6,291,603 B1 | 9/2001 | Glover | |
| 6,402,959 B1 | 6/2002 | Dessapt et al. | |
| 6,454,948 B2 | 9/2002 | Ferschneider et al. | |
| 6,797,175 B2 | 9/2004 | Hotier | |
| 7,265,189 B2 | 9/2007 | Glover | |
| 7,314,551 B2 | 1/2008 | Frey et al. | |
| 7,427,385 B2 | 9/2008 | Scheirer et al. | |
| 8,062,521 B2 | 11/2011 | Glover | |
| 8,282,890 B2 | 10/2012 | Niknafa et al. | |
| 8,293,195 B2 | 10/2012 | Blanchard | |
| 9,205,392 B2 | 12/2015 | Byl et al. | |
| 9,352,292 B2 | 5/2016 | Solantie et al. | |
| 9,732,774 B1 * | 8/2017 | Glover | F15D 1/00 |
| 2001/0015336 A1 | 8/2001 | Glover | |
| 2004/0031729 A1 | 2/2004 | Meier et al. | |
| 2004/0084352 A1 | 5/2004 | Meier et al. | |
| 2004/0192862 A1 | 9/2004 | Glover | |
| 2006/0251555 A1 | 11/2006 | Warner et al. | |
| 2006/0275185 A1 | 12/2006 | Tonkovich et al. | |
| 2009/0146339 A1 | 6/2009 | Malone et al. | |
| 2009/0211441 A1 | 8/2009 | Reyes et al. | |
| 2009/0283479 A1 | 11/2009 | Warner et al. | |
| 2010/0209315 A1 | 8/2010 | Niknafs | |
| 2012/0237434 A1 | 9/2012 | Blanchard et al. | |
| 2016/0136603 A1 | 5/2016 | Parihar et al. | |
| 2017/0234339 A1 | 8/2017 | Glover | |
| 2018/0008952 A1 | 1/2018 | Glover et al. | |

FOREIGN PATENT DOCUMENTS

| | | |
|---|---|---|
| EP | 260826 | 3/1988 |
| EP | 651041 | 5/1995 |
| EP | 719578 | 7/1996 |
| FR | 2480137 | 10/1981 |
| GB | 267877 | 1/1927 |
| GB | 374707 | 7/1932 |
| GB | 933124 | 8/1963 |
| WO | 2017139597 | 8/2017 |

OTHER PUBLICATIONS

European Patent Office; PCT Written Opinion of the International Searching Authority, Issued in Connection to PCT/US2017/017398; 8 pages; Europe.

Narayan, Rashmi; Particle Capture From Non-Aqueous Media on Packed Beds; Dept. of Chemical and Materials Engineering; Fall 1996; Edmonton Alberta.

Dr. Ken J. Mills; Ceramic Guard Bed Materials; Seminar for CatCon '98; Jun. 3-5, 1998, Akron, Ohio.

Kenneth R. Butcher; Reticulated Ceramic Foam as a Catalyst Support; Seminar for CatCon '98; Jun. 3-5, 1998; Akron Ohio.

Woodward et al.; Akzo Chemicals' Guard Bed Technology; 1991.

Norton Chemical Process Products Corp.; Denstone Inert Catalyst Bed Supports; 1992; Akron Ohio.

Sweeting, et al.; Reticulated Ceramics for Catalyst Support Applications; Hi-Tech Ceramics, Inc.; Nov. 30, 1994.

Ceramic Industry Cover Page and Table of Contents; vol. 147, No. 3, Mar. 1997.

Foseco Home Page; Internet; p. 1-3; Feb. 21, 1997.

Selee Corporation Home Page; Internet, Nov. 14, 1996.

Selee Corporation; Ceramic Foam for Thermal/Kiln Furniture Applications; Ceramic Foam Kiln Furniture Physical Property Data Sheet; Nov. 14, 1996.

NPRA Q&A Session on Refining and Petrochemical Technology, Section B. Hydrotreating; p. 85-101; 1990.

NPRA Q&A Session on Refining and Petrochemical Technology; Section B. Hydrotreating; p. 98-118; 1991.

NPRA Q&A Session on Refining and Petrochemical Technology; Section B. Hydrotreating; p. 104-135; 1992.

NPRA Q&A Session on Refining and Petrochemical Technology; Section B. Hydrotreating; p. 94-112; 1993.

NPRA Q&A Session on Refining and Petrochemical Technology; Section B. Hydrotreating; p. 98-139; 1994.

NPRA Q&A Session on Refining and Petrochemical Technology; Section B. Hydrotreating; p. 96-123; 1995.

NPRA Q&A Session on Refining and Petrochemical Technology; Section B. Hydrotreating; p. 131-160; 1996.

Hickman, et al.; Production of Syngas by Direct Catalytic Ocidation of Methane; Science; vol. 259; p. 343-346; Jan. 15, 1993.

Sinter Metals; High Porosity Sintered Mataerials; p. 1-16; undated, May 1997.

Christy Refractories Company; Prox-Svers Catalyst Support Media; Apr. 1995.

Haldor Topsoe, Inc.; Material Safety Data Sheet Inert Topping TK-10; p. 1-4; 1992.

Perry's Chemical Engineers' Handbook, 7th Ed., McGraw-Hill, 1997, pp. 6-33-6-34.

Schlichting, Boundary-Layer Theory; McGraw-Hill; (Translation of Grenzschicht-Theorie, Translated by Dr. J. Kestin), 1979; pp. 230-234.

Tan-Atichat and Nagib, "Interaction of free-stream turbulence with screens and grids: a balance between turbulence scales" J. Fluid Mech (1982), vol. 114, pp. 501-528; Great Britain.

Loehrke and Nagib, AGARD Report No. R-598 Experiments on Management of Free-stream Turbulence 1972.

Petro Ware, Inc.; 86 Catalyst Support Media "Premium, Quality from Beginning to End"; 1992; 21 pages; Crooksville, Ohio.

(56) References Cited

OTHER PUBLICATIONS

Strom, et al.; Advanced Reticulated Ceramics; Hi-Tech Ceramics; at least as early as Nov. 11, 1998; p. 14-19.
Hi-Tech Ceramics; Reticel, Designing the Future with Advanced Reticulated Ceramics; Product Brochure; at least as early as Nov. 11, 1998; 6 pages.
Selee Corporation; Product Brochure; 1997;6 pages.
Saxonburg Ceramics Incorporated; Product Material Specifications; Nov. 14, 1996; 3 pages.
Koch; Reactor Internals by Koch, Your Way; at least as early as Nov. 11, 1998.
GKN Sinter Metals; Design Ideas and Application—Porous Discs; at least as early as Nov. 11, 1998; 4 pags.
Sinter Metals; High Porosity SIKA-R. IS.TM., Porous Metal Filter Elements; at least as early as Nov. 11, 1998; 3 pages.
Sinter Metals; Tool List, Seamless SIKA-Elements; at least as early as Nov. 11, 1998; 2 pages.
Criterion; Top Bed Catalysts and Support; at least as early as Nov. 11, 1998; 1 page.

\* cited by examiner

USE OF TREATING ELEMENTS TO FACILITATE FLOW IN VESSELS

RELATED APPLICATIONS

This application is a continuation application and claims the benefit, and priority benefit, of U.S. patent application Ser. No. 15/676,603, filed Aug. 14, 2017, which claims the benefit and priority benefit of U.S. patent application Ser. No. 15/265,405, filed Sep. 14, 2016, which claims the benefit and priority benefit of U.S. Provisional Patent Application Ser. No. 62/314,069, filed Mar. 28, 2016 and U.S. Provisional Patent Application Ser. No. 62/294,768, filed Feb. 12, 2016, the contents of each are incorporated by reference herein in their entirety.

BACKGROUND

Field of the Invention

The presently disclosed subject matter relates to facilitating the flow of streams within vessels utilized in the process industry.

Description of Related Art

The number of bed vessels installed and operating in industry totals in the tens of thousands worldwide. Bed vessels are usually large with diameters ranging from 4 to 18 feet and heights from 10 to over 100 feet. The volume of such bed vessels is substantially filled with bed vessel internals. Each year, the number of bed vessels that are shutdown or are constructed and commissioned totals in the hundreds. The designed lifetime of these bed vessels is typically measured in decades. Bed vessels used in industry contain appropriate internals which can include one or more beds of solid processing material elements which facilitate intended processing operations. Such solid processing material elements can include, for example, reaction-promoting catalysts and mass transfer-promoting agents including sieves and sorbents. Bed vessels and their contents represent a very sizable investment by the bed vessel owner.

The normal length of a typical bed vessel "on oil" operating cycle (from vessel startup to vessel shutdown) is measured in months or years. Normal operations are usually halted when bed vessel internals reach performance limits or when bed vessel operating conditions, such as temperature or pressure, exceed operating limits. Such shutdowns are typically followed by rejuvenation of, repair to and/or replacement of bed vessel internals followed by restart of operations.

It is known in the art to utilize suitable materials to promote flow distribution for streams entering bed vessels. The purpose of such distribution is to subdivide the streams into rivulets which improve stream contact with bed vessel processing materials. Three dimensional reticulates are known to promote flow distribution. For example, U.S. Pat. Nos. 6,258,900, 6,291,603 and 7,265,189 each describes such reticulated materials.

Many bed vessels face challenges associated with sustaining effective and efficient utilization of bed vessel internals including effective and efficient stream flow distribution across and throughout the beds of solid processing material elements installed in the bed vessels. Inadequate stream flow distribution leads to coalescence of small stream rivulets into larger streams resulting in stream flow channeling which can result in bypassing portions of the bed vessel processing internals.

Stream flow channeling within a bed vessel can occur and change over time due to shifts in operating conditions (e.g., changing compositions of feed streams), operations upsets (e.g., power surges/cuts, pump failures, etc.), natural or accelerated aging of bed vessel internals and the like. Channeling can occur when coalescence is facilitated by smaller fluid streams contacting each other or by contact with other bed vessel internals or with the bed vessel itself. Channeling is undesirable because it results in areas of underexposed and underutilized bed vessel internal materials and areas of overexposed materials. The former can result in significant loss of bed vessel productivity and profitability. The latter can result in so-called "hot spots" where sharp temperature gradients cause damage to the vessel and its internals.

One approach to coping with these situations has been to tolerate moderate bed vessel underperformance and operate the vessel until performance has degraded to an unacceptable level. At such a time, the bed vessel is shutdown so that bed vessel internals can be adjusted, rejuvenated or replaced. This mode of operation results in reduced "on-oil" operating time with accompanying loss of bed vessel productivity and profitability.

Another approach has been to install one or more conventional structured engineering devices at appropriate locations within the bed vessel to facilitate flow redistribution within and across the cross section of bed vessels and, in doing so, increase stream flow contact with bed vessel internals (including beds of solid processing materials) and reduce the negative consequences of stream flow channeling. Such conventional devices include engineered equipment structures that are typically form-fitted to the inside of the bed vessel and which can occupy up to ten feet of depth within the bed vessel. Such devices are costly to design, fabricate, install, operate and maintain and requires specially-trained personnel to do so. These conventional devices also require complex monitoring and containment systems to ensure segregation from other bed vessel internals. In the example of catalytic reactors, this applies to segregating conventional redistribution devices from catalyst via "catalyst containment" equipment and measures. Any loss of catalyst containment can result in process and safety risks. Considerable measures are taken and bed vessel space dedicated to ensuring that catalyst containment is ensured. The very presence of such conventional redistribution and containment equipment and the difficulty of sustaining their stable and controlled operation can lead to problems up to and including development of bed vessel shell hot spots leading potentially to rupture of the bed vessel itself.

The very presence of such conventional structured engineered devices consumes space that could otherwise be consumed by more productive and more profitable bed vessel internals, such as catalyst. An example of such a structured engineered apparatus and its use as a flow distributor is shown in U.S. Pat. No. 7,314,551 granted Jan. 1, 2008 to UOP, LLC of Des Plaines, Ill.

Improvements in this field of technology are desired.

SUMMARY

In accordance with the presently disclosed subject matter, various illustrative embodiments of methods for facilitating the distribution and redistribution of the flow of one or more streams within vessels are provided. Streams can include liquid and vapor streams, combinations of the two and mixtures of the two. Vessels can include those containing beds of solid materials utilized for processing (hereinafter referred to as "bed vessels").

In certain illustrative embodiments, a method of improving the distribution and redistribution of the flow of one or more streams in a bed vessel is provided. The bed vessel can be configured to have more than one processing zone positioned vertically with respect to one another within the bed vessel with one uppermost processing zone and one or more processing zones positioned downstream of the uppermost processing zone. The processing zones can contain beds of solid processing material elements. Redistribution treating zones can be disposed downstream of an upstream processing zone and upstream of a downstream processing zone in order to facilitate effective and efficient redistribution of the flow of streams exiting the upstream processing zone and entering said downstream processing zone. One primary objective of such redistribution treating zones is to facilitate the dispersal across the cross sectional area of the downstream processing zone of the stream exiting the upstream processing zone and entering the downstream processing zone. The stream exiting the redistribution treating zone and entering the downstream processing zone can be subdivided into small individual stream rivulets, which is an improvement over the channeled stream entering the redistribution treating zone from the upstream processing zone. The dispersed stream rivulets affect improved contact with and utilization of the beds of solid processing material elements contained in the downstream processing zone. The bed vessel's utilization and performance can be significantly improved compared with the utilization and performance of a bed vessel configuration that excludes the presence of said redistribution treating zones.

In certain illustrative embodiments, a method of improving flow distribution for one or more streams in, or at various locations throughout, a bed vessel is provided. The one or more streams can be passed through an upstream processing zone and a downstream processing zone within the bed vessel. The upstream processing zone and downstream processing zone can each contain one or more beds of solid processing material elements. The one or more streams can also be passed through at least one redistribution treating zone located between the upstream processing zone and downstream processing zone. The redistribution treating zone can contain treating material that redistributes the flow of the one or more streams. The beds of solid processing material elements in the upstream processing zone can be separated from the treating materials in the immediate downstream redistribution zone by a permeable barrier. Alternatively, the upstream processing zone materials can be directly adjacent to and in contact with the treating materials in the immediately downstream redistribution treating zone, without any physical equipment or barrier therebetween, such that the solid processing material elements from the upstream processing zone are capable of at least partially commingling with the treating materials in the immediately downstream redistribution treating zone to create a combo-zone containing both solid processing material elements and treating materials and possessing both processing and stream distribution treatment functionalities. Such migration is typically limited to the first few inches of depth of the redistribution treating zone materials. The solid processing material elements can occupy at least 20% of the volume of that portion of the layer of treating materials contained in the redistribution treating zone into which the solid processing material elements have migrated.

The redistribution treating zone can be downstream of and directly adjacent to the upstream processing zone such that certain of the solid processing material elements from the upstream processing zone migrate into the redistribution treating zone to create a combo-zone having both solid processing material elements and treating materials commingled therein. In certain illustrative embodiments, there is no physical equipment or barrier disposed in the vessel between the upstream processing zone and the immediately downstream treating zone. The solid processing material elements in the upstream processing zone can migrate into the layer of treating materials contained in the immediately downstream redistribution treating zone. Such migration is typically limited to the first few inches of the redistribution treating zone materials. The solid processing material elements can occupy at least 20% of the volume of that portion of the layer of treating materials contained in the redistribution treating zone into which the solid processing material elements have migrated. In certain illustrative embodiments, solid processing material elements are initially mixed with the materials in the treating zone, such that co-mingling is achieved without the need for migration from other zones.

Redistribution treating zones can have a depth of one foot or less. Redistribution treating zones can have a depth of two feet or less. Redistribution treating zones can have a depth of four feet or less.

Redistribution treating zones can contain treating materials. Such materials can be comprised of at least one layer of fixed, form-fit material conforming to the interior dimensions of the bed vessel. Such form-fit materials, such as fibrous meshes, provide porous structures which facilitate stream flow redistribution. Alternatively, treating materials can be comprised of a plurality of treating elements. The treating elements can be individual treating elements. The treating elements can be disposed in layers. The treating elements can be randomly-packed treating elements. One or more of the treating elements can be ceramic reticulates. One or more of the treating elements can have a quasi ellipsoid shape. One or more of the treating elements can have a triaxial ellipsoid shape. One or more of the treating elements can have an oblate spheroid shape. One or more of the treating elements can have a prolate spheroid shape. One or more of the treating elements can have a briquette shape. One or more of the treating elements can have an asymmetrical spheroid shape. One or more of the treating elements can have an aspherical ellipsoid shape. One or more of the treating elements can have at least one opening formed therein. One or more of the treating elements can have at least one opening formed therethrough. One or more of the treating elements can have one or more asperities formed on the surfaces thereof. The asperities can comprise one or more of flutes, fins, struts, filaments, spikes or hairs.

In certain illustrative embodiments, a method of improving the flow distribution of one or more streams in and throughout a bed vessel is provided in which redistribution treating zones containing a plurality of treating elements is disposed immediately downstream of processing zones. In such a configuration, the solid processing material elements in an upstream processing zone can migrate into the redistribution treating zone and commingle with the treating elements in the redistribution treating zone to form a combo-zone with both solid processing material elements and treating elements and their functionalities.

In certain illustrative embodiments, a method of improving the flow distribution of one or more streams in and throughout a bed vessel is provided in which redistribution treating zones containing a plurality of treating elements is disposed immediately downstream of processing zones. In such a configuration, the solid processing material elements in an upstream processing zone are commingled with the treating elements in the redistribution treating zone to form a combo-zone with both solid processing material elements and treating elements and their functionalities.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

DETAILED DESCRIPTION

In accordance with the presently disclosed subject matter, various illustrative embodiments of methods for facilitating the redistribution and lateral redispersion of the flow of one or more streams within bed vessels are provided.

The concept of "redistribution" as described in the presently disclosed subject matter concerns the division and dispersion of process streams across and throughout the internals contained within a bed vessel. Such division and dispersion is facilitated by redistribution treating zones disposed to counter negative stream coalescing effects which cause stream channeling and which, at best, prevent achievement of the designed performance of the processing zones installed within the bed vessel and, at worst, cause unsafe operating circumstances which increase operating risk.

In certain illustrative embodiments, disposed within such bed vessels are internal materials and structures as well as multiple operating zones. One type of operating zone can be a processing zone composed of one or more beds of solid processing material. A second type of operating zone can be a treating zone. Treating zones can facilitate the distribution and dispersion of the one or more streams exiting or entering processing zones. The distribution can facilitate contact between the streams and the beds of solid processing material elements contained in the processing zones. A treating zone positioned between an upstream processing zone and a downstream processing zone can also be called a redistribution treating zone.

In certain illustrative embodiments, redistribution treating zones can be utilized in the bed vessels. The redistribution treating zones can contain treating materials at sufficient depths and locations to facilitate desired stream flow redistribution and redispersion across and throughout the downstream processing zone beds of solid processing material elements.

In certain illustrative embodiments, the redistribution treating materials can be comprised of at least one layer of fixed, form-fit material conforming to the interior dimensions of the bed vessel. Alternatively, redistribution treating materials can be in the form of a plurality of individual treating elements that are randomly or otherwise packed into treating zone layers.

In certain illustrative embodiments, the individual redistribution treating elements can have a variety of shapes and sizes including discs, spheres, rings, wagon wheels, hollow tubes and the like. The one or more of the redistribution treating elements can have at least one or more openings therein and/or therethrough. The one or more of the redistribution treating elements can have one or more asperities formed on the surfaces thereof which can include, without limitation, flutes, fins, struts, filaments, spikes or hairs. The one or more of the redistribution treating elements can be ceramic reticulates. Reticulates are characterized as having one or more open cells which form a plurality of interconnected fluid flow pathways within and through the elements. Such pathways can have tortuous geometries. Such redistribution treating elements with their openings, asperities and interconnected internal fluid flow pathways have large surface areas which facilitate stream flow division and redistribution. Such redistribution treating elements shall hereinafter be referred to as "treating elements."

In certain illustrative embodiments, one or more of the treating elements can have a quasi ellipsoid shape. For example, one or more of the quasi ellipsoid shaped treating elements can have a triaxial ellipsoid shape. The one or more of the quasi ellipsoid shaped treating elements can also have an oblate spheroid shape. The one or more of the quasi ellipsoid shaped treating elements can also have a prolate spheroid shape. The one or more of the quasi ellipsoid shaped treating elements can also have a briquette shape. The one or more of the quasi ellipsoid shaped treating elements can also have an asymmetrical spheroid shape. The one or more of the quasi ellipsoid shaped treating elements can also have an aspherical ellipsoid shape.

In certain illustrative embodiments, the prolate, oblate, and asymmetric shaped quasi ellipsoids can have one mathematic model which can be generalized to all three shapes. For example, the oblate and prolate shaped spheroids can be special cases of the generic, asymmetric ellipsoid ($a=b$, $b=c$, or $a=c$), or shapes substantially similar to such shapes, according to the following formula:

$$\frac{x^2}{a^2} + \frac{y^2}{b^2} + \frac{z^2}{c^2} = 1$$

In certain illustrative embodiments, the briquette shape can be defined as the volumetric intersection of two or more elliptical cylinders where the major-axes of the elliptical faces of each cylinder are coplanar, or shapes substantially similar to such shapes.

In certain illustrative embodiments, redistribution treating zones within bed vessels can have a depth of one foot or less. Alternatively, redistribution treating zones can have a depth of two feet or less. Alternatively, redistribution treating zones can have a depth of four feet or less.

In certain illustrative embodiments, a redistribution treating zone containing a plurality of randomly-packed individual treating elements can be disposed immediately downstream of an upper processing zone without any barrier between the two zones. In such a configuration, the individual solid processing material elements in the upper processing zone can migrate into the top few inches of the layer of treating elements in the downstream redistribution treating zone and commingle with these elements. Typical treating elements are each up to 50 times the size of individual solid processing material elements, in certain illustrative embodiments. With some solid processing material elements, treating elements can be over 100 times the size of individual solid processing material elements, in certain illustrative embodiments. With some solid processing material elements, treating elements can be over 200 times the size of individual solid processing material elements, in certain illustrative embodiments.

The commingling of the individual solid processing material elements from the upper processing zone with the treating elements of the downstream redistribution treating zone results in solid processing material elements consuming at least 20% of the volume of that portion of the redistribution treating zone into which said solid processing material elements have migrated, in certain illustrative embodiments. Such a zone containing commingled solid processing material elements and treating elements shall be referred to herein as a "combo-zone," wherein solid processing material elements are mixed with and/or have migrated into a redistribution treating zone and are commingled with treating elements present in the treating zone. Combo-zones are especially beneficial because they consume a modest amount of bed depth and simultaneously and inexpensively improve both the processing and redistributive functions being performed within the bed vessel.

To facilitate commingling of combo-zone materials, loading procedures for bed vessel materials can call for sequential loading, for example, partial loading of a portion of the treating materials contained in a redistribution zone followed by partial loading of solid processing material elements followed by additional partial loading of treating elements followed by processing material elements. In certain illustrative embodiments, loading in this manner will facilitate the migration of materials from one zone to another within the vessel and commingling of said materials in the combo-zone during process operations. In certain illustrative embodiments, the material may also be mixed during loading such that commingling of materials in the combo-zone is initially achieved without the need for any materials to migrate from one zone to another within the vessel.

A redistribution treating zone can be of sufficient depth and location to improve the utilization and performance of the immediately downstream processing zones by efficiently facilitating the redistribution and redispersion of the flow of fluid streams exiting the redistribution treating zone and entering the downstream processing zones.

Redistribution treating zones can obviate the need for costly and risky conventional structured engineering devices and free valuable vessel volume (that is, bed depth) for more productive uses such as additional processing materials (e.g., catalyst).

In certain illustrative embodiments, bed vessel internals can be configured to include multiple processing zones, treating zones and/or combo-zones. Overall bed vessel performance is dependent on the proper performance of each zone. Zones with processing functionality can perform their designed functions depending on the extent to which streams passing through said processing zones effectively interact with the solid processing material elements in the processing zones. Zones with treating functionality can ensure that suitably distributed streams are delivered to zones with processing functionality. Within the dimensional constraints of the bed vessels themselves, maximizing bed vessel performance can typically be achieved by minimizing the space (that is, bed depth) consumed by treating materials and maximizing the space (that is, bed depth) consumed by processing material elements. For example, in certain illustrative embodiments, the presently disclosed subject matter relates to processing zones of solid processing material elements that are composed of relatively small individual elements whose size varies from that of rice to that of corn kernels.

Relative to conventional solutions, the presently disclosed subject matter advantageously provides stream flow redistribution options that: (i) are less costly and less complex to design, fabricate, install, operate and maintain, (ii) free volume (that is, bed depth) in the bed vessel that can be better filled with more productive bed vessel internals—such as additional solid processing material elements, (iii) avoid the operating risks associated with "containment" related facilities and (iv) improve bed vessel performance and profitability via increased contact and interaction between streams and bed vessel processing materials.

Figure 1A:
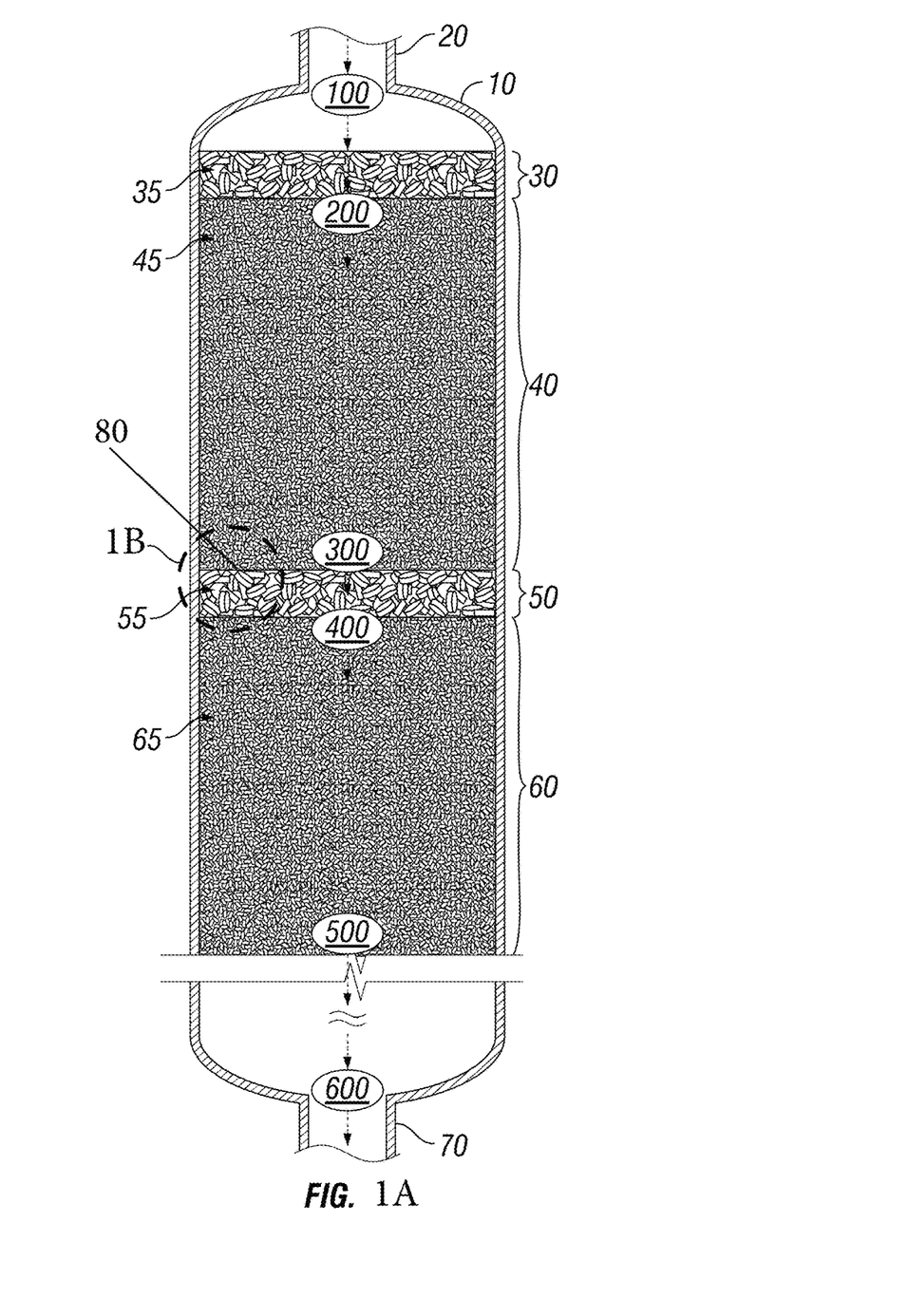
FIG. 1A is a partial cross-sectional side view of a bed vessel having a plurality of zones in accordance with an illustrative embodiment of the presently disclosed subject matter.

Various illustrative embodiments of a method for redistributing the flow of one or more streams within a bed vessel are provided herein. Referring now to FIG. 1A, a bed vessel 10 is shown having two processing zones 40, 60 disposed therein. Bed vessel 10 is illustrated in a down-flow configuration, such that the one or more input streams 100 will enter the bed vessel 10 at the inlet 20 and the one or more product streams 600 will exit the bed vessel 10 at the outlet 70.

In certain illustrative embodiments, input streams 100 enter the vessel and pass through a "top bed" zone 30 containing elements 35. The top bed zone can facilitate distribution of the input streams 100 across the cross-section of processing zone 40. The top bed zone can also facilitate filtration of particulate contaminants contained in the input streams 100. The top bed zone can also mitigate undesired species contained in input streams 100. The stream 200 exiting the "top bed" zone 30 will possess these desirable characteristics before entering processing zone 40.

In certain illustrative embodiments, process streams 200 are processed in process zone 40 and the resulting process streams 300 exit zone 40. A redistribution treating zone 50 containing treating elements 55 can be provided in the bed vessel 10 downstream of the first processing zone 40. In certain illustrative embodiments, the flow of the one or more streams 300 may be divided and redistributed in redistribution treating zone 50 before being introduced to a downstream processing zone 60.

Figure 1B:
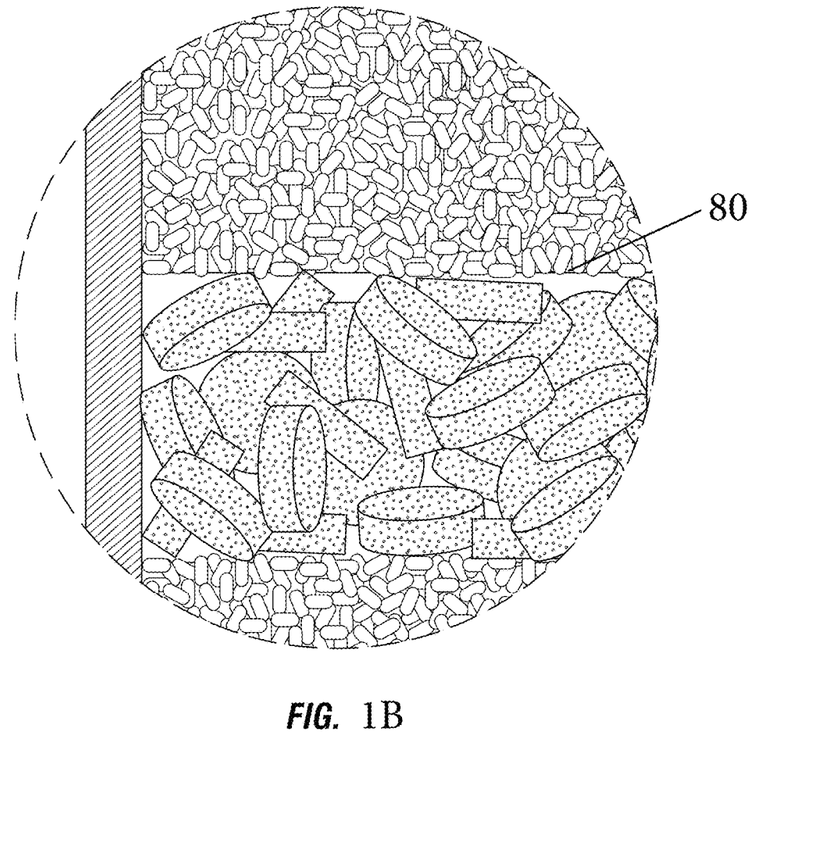
FIG. 1B is a partial cross-sectional side view of a bed vessel having a plurality of zones with a close up view of adjacent zones in the bed vessel with a permeable barrier therebetween in accordance with an illustrative embodiment of the presently disclosed subject matter.

FIG. 1B shows an enlarged view of redistribution zone 50 containing treating elements 55 disposed between processing zones 40 and 60. In this embodiment, a permeable barrier 80 is placed between processing zone 40 and redistribution zone 50 in order to separate the processing zone 40 from the redistribution treating zone 50 and prevent migration of processing zone materials 45 while still allowing stream flow 300 to pass through to zone 40 to zone 50. In other words, redistribution treating zone 50 is directly adjacent to upstream processing zone 40 and a permeable barrier 80 is disposed between zone 50 and zone 40 such that the processing materials 45 from zone 40 cannot migrate into zone 50 but the stream flow may pass through the barrier 80. In certain illustrative embodiments, permeable barrier 80 can be a wire screen mesh.

Figure 2A:
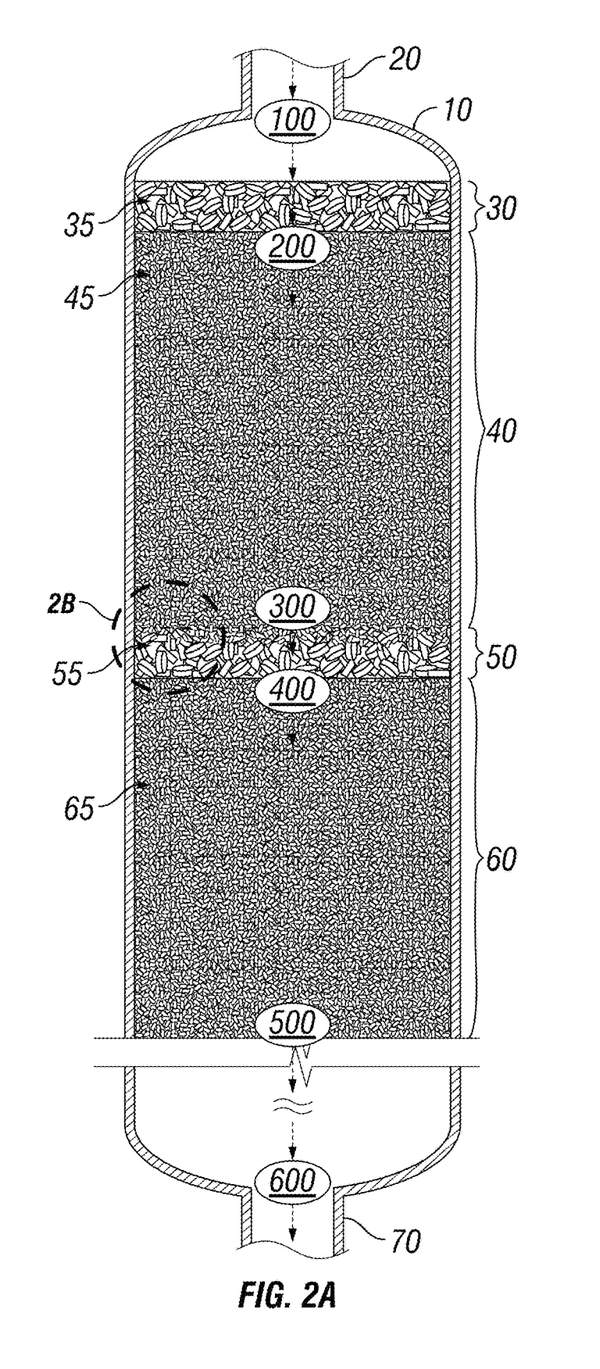
FIG. 2A is a partial cross-sectional side view of a bed vessel having a plurality of zones in accordance with an illustrative embodiment of the presently disclosed subject matter.
Figure 2B:
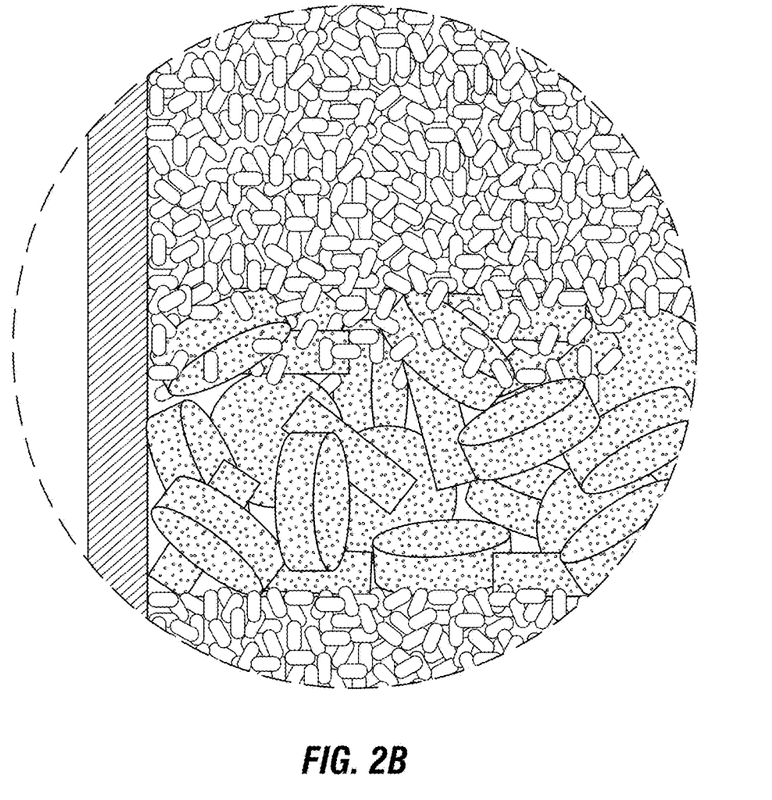
FIG. 2B is a partial cross-sectional side view of a bed vessel having a plurality of zones with a close up view of a combo-zone between two adjacent zones in the bed vessel in accordance with an illustrative embodiment of the presently disclosed subject matter.
Figure 3:
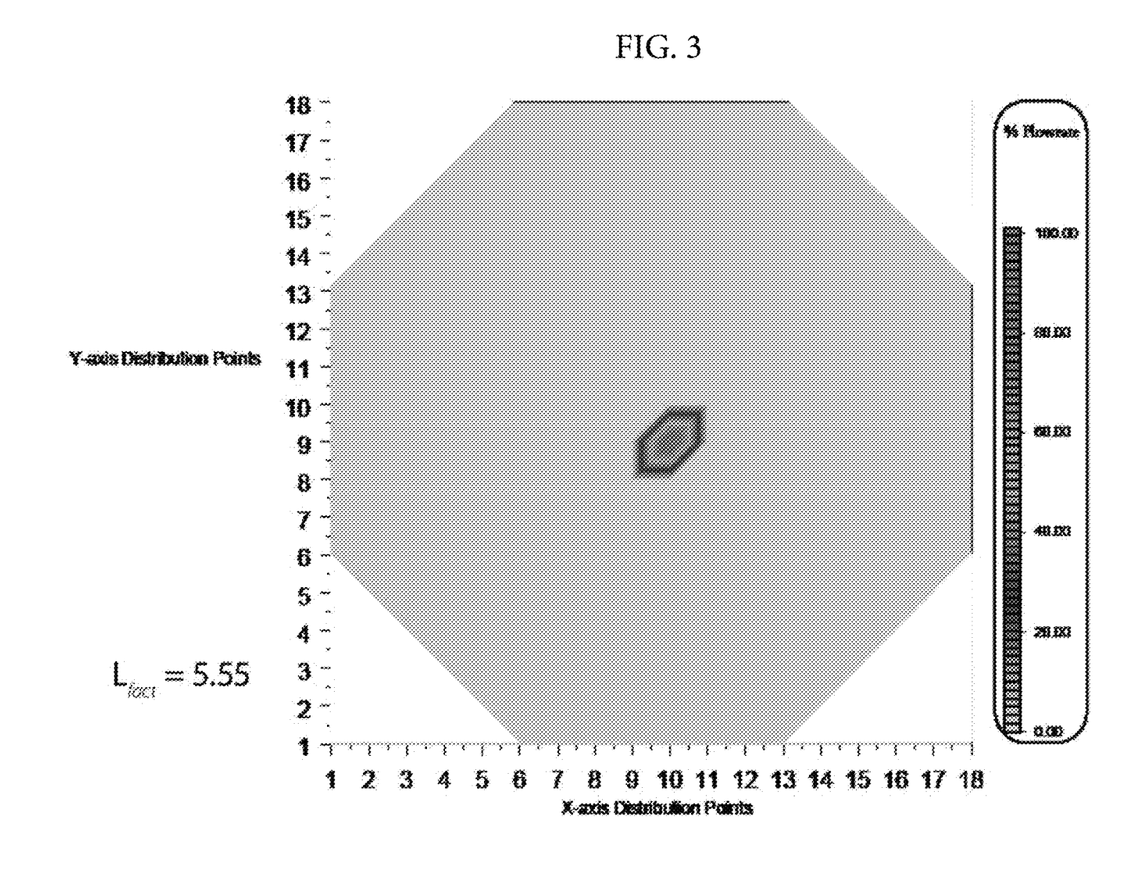
FIG. 3 is a graph showing flow redistribution test results for an empty test vessel in accordance with an illustrative embodiment of the presently disclosed subject matter.

FIGS. 2A and 2B show a bed vessel configuration similar to that in FIGS. 1A and 1B. However, as shown in the enlarged view of FIG. 2B, no barrier is placed between the upper processing zone 40 and the redistribution treating zone 50. In such an embodiment, a combo-zone can be formed (as depicted in FIG. 2B) wherein individual elements of processing zone materials 45 can migrate into and commingle with the top few inches of the layer of redistribution zone treating elements 55.

Such a combo-zone configuration lacking barrier constraints between the processing zone and the redistribution treating zone has the following advantages: (i) eliminates the need for and cost of design, fabrication, installation, operation and maintenance of such barriers, (ii) reduces the space required to install such barriers, (iii) minimizes the space required to achieve desired flow redistribution, (iv) allows for an increase in processing zone performance due to the addition of processing zone materials in the space freed by the absence of barriers, (v) adds additional processing zone performance due to the presence of processing zone materials in the combo-zone and (vi) increases the performance and profitability of the bed vessel by increasing interaction between streams and the vessel's processing zone materials.

In certain illustrative embodiments, the combo-zone will comprise the first few inches of depth of the redistribution treating zone 50. This is in the context of a bed vessel that may be as tall as 100 feet or more with operating zones that substantially fill the vessel. In certain illustrative embodiments, the combo-zone will comprise about the first two (2) inches of depth of the redistribution treating zone 50. In certain illustrative embodiments, the combo-zone will comprise about the first six (6) inches of depth of the redistribution treating zone 50. In certain illustrative embodiments, the combo-zone will comprise the first twelve (12) inches of depth of the redistribution treating zone 50.

As shown in FIG. 1A, redistribution treating zone 50 can be located at or near an upper region of vessel 10, in certain illustrative embodiments, to facilitate redistribution of process steam flow from processing zone 40 into processing zone 60 and/or other lower-positioned zones within vessel 10. In this regard, there can be one or more processing zones and redistribution zones disposed between streams 500 and 600 in vessel 10 that are located downstream from the zones as depicted in FIG. 1A.

In certain illustrative embodiments, stream flow redistribution is primarily facilitated by contacting the stream with the surfaces of the redistribution zone treating elements. These surfaces include the external surfaces of the treating elements and the internal surfaces of the treating elements. The internal geometries of treating elements create large surface areas formed by openings, asperities and a plurality of interconnected internal fluid flow pathways.

In certain illustrative embodiments, the surface area of individual treating elements can be from 70% to 90% internal surface area with the remainder being external surface area. A result is that, for a given volume of treating elements, treating element shapes that pack more densely provide more surface area than treating element shapes that pack less densely. Stream flow redistribution capability per volume of packed treating elements, therefore, increases as packing density increases. This applies as well to the external void space between packed treating elements which decreases as packing density increases.

In certain illustrative embodiments, the amount of material required in a treating zone to achieve a desired level of stream flow redistribution in a bed vessel is primarily a function of the total volume of materials not including voidage external to the treating elements. Relative to cylindrical reticulates, quasi-ellipsoid shaped treating elements tend to pack with less void space between individual elements. For example, treating zones of quasi-ellipsoidal shaped treating elements can have external void space of 25 to 35% compared to 40 to 55% for treating zones of cylindrical reticulates. To achieve a desired level of stream flow redistribution, this can result in treating zones of quasi-ellipsoid shaped treating elements less deep than those formed by an equivalent amount of cylindrical reticulates. This saves space in the bed vessel.

Further, the ability of a treating zone of individual treating elements to redistribute the flow of one or more process streams depends in part on the number of contact points each treating element has with its neighboring elements. Maximizing contact points facilitates stream flow redistribution thru the treating zone. Treating zones of quasi-ellipsoidal treating elements can have 60 to 90% more of such contact points than do equivalent layers of cylindrical or spherical reticulates.

To facilitate a better understanding of the presently disclosed subject matter, the following examples of certain aspects of certain embodiments are given. In no way should the following examples be read to limit, or define, the scope of the presently disclosed subject matter.

Experiments were performed to demonstrate process stream redistribution, including the mitigation/elimination/disruption/reduction of channeling, of a process stream exiting an upstream bed vessel processing zone and transiting/passing thru a bed vessel redistribution treating zone in accordance with certain illustrative embodiments of the presently disclosed subject matter.

A fabricated testing structure was assembled including a vertical cylindrical vessel approximately 12 inches in diameter and over 36 inches tall. A nozzle located above the centerpoint of the vessel was used to pass liquid into the vessel. The cylindrical vessel provided sufficient space for a bed of randomly-packed test elements up to 36 inches deep. Over 300 holes, each ¼" in diameter were drilled in a regular grid pattern thru the bottom of the vessel. Each hole was individually connected to a plastic tube utilized to collect and measure liquid exiting the vessel thru the hole. These holes represent a two dimensional grid zone of the cross-sectional area of the vessel. The liquid collected thru each hole shows the distribution of the inlet liquid across the cross-sectional area of the vessel.

Liquid was pumped thru the nozzle into the vessel. The stream of liquid emulates channeled streams which occur in the processing zones of commercial bed vessels. In one test run, the vessel was empty. In other test runs, various types and depths of test elements were installed. In each test run sufficient time was elapsed to obtain representative quantities of liquid via the tube-connected holes in the bottom of the vessel. Data collection and analysis produced graphical plots demonstrating the ability of the test elements to laterally disperse the liquid thru the test element bed and exit the vessel thru the holes in the bottom of the vessel.

In a typical run in which test elements are placed in the vessel, the liquid is allowed to disperse as it flows around and thru the test elements, exits the vessel thru the grid zone holes and is collected in the tubes below. The amount of water collected in each tube is measured and graphs are prepared which show the extent to which the elements facilitate flow redistribution.

Figure 4:
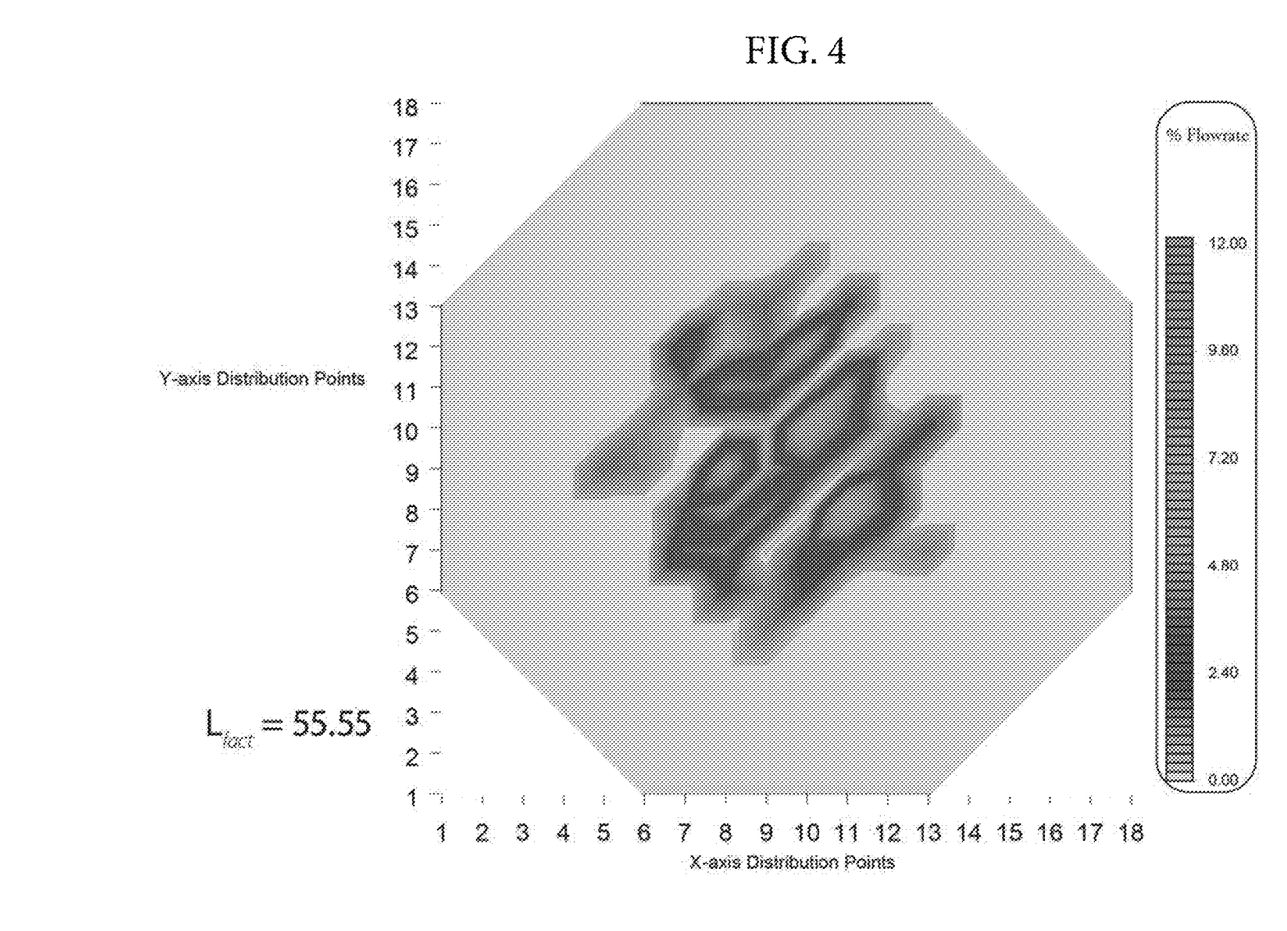
FIG. 4 is a graph showing flow redistribution test results for a bed of randomly-packed ¾" support ball test elements in accordance with an illustrative embodiment of the presently disclosed subject matter.
Figure 5:
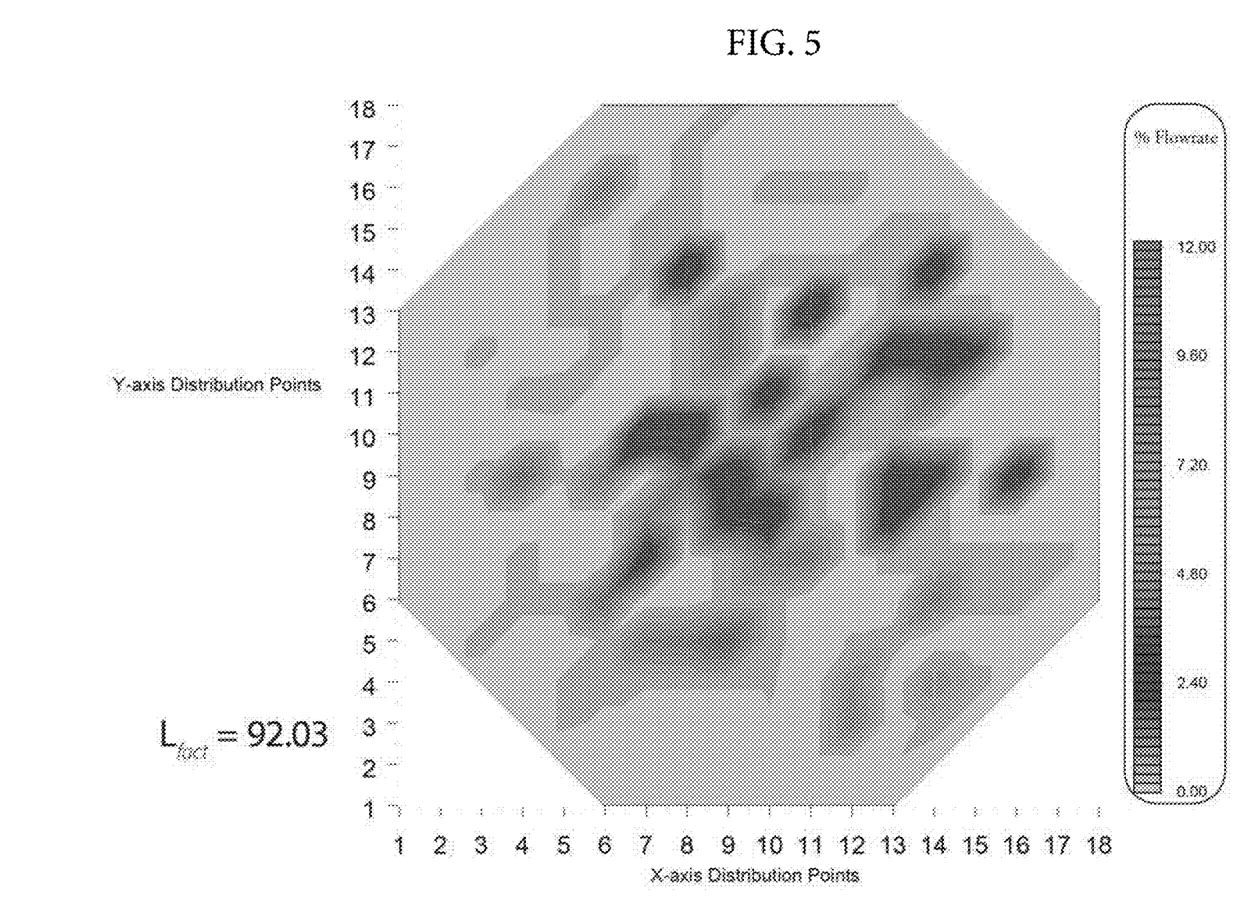
FIG. 5 is a graph showing flow redistribution test results for a bed of randomly-packed treating elements in accordance with an illustrative embodiment of the presently disclosed subject matter.

The graphical plots of flow redistribution test results are shown in FIGS. 4-6. Shown are the amounts of liquid recovered thru the tubes connected to the holes in the vessel grid zone. FIG. 4 shows the flow redistribution test results for an empty test vessel. FIG. 5 shows the flow redistribution test results for a bed of randomly-packed ¾" support ball test elements. FIG. 6 shows the results for a bed of randomly-packed treating elements according to the presently disclosed subject matter.

In FIG. 4, when there were no test elements in the vessel and liquid was run into an empty cylinder, the bank of tubes show just over 5% of the liquid being laterally distributed as measured by the result $L_{fact}$. The greater than 5% result includes the liquid which passed thru the center line holes of the vessel demonstrating that virtually all the liquid exited the vessel through the holes at or near the center of the vessel grid zone. In FIG. 5, the bed of randomly-packed support balls achieved just over 55% lateral distribution of the liquid across the vessel grid zone. In FIG. 6, the test run using a bed of randomly-packed treating elements according to the presently disclosed subject matter achieved over 92% lateral distribution of the liquid across the vessel grid zone.

It can be seen from these test results that beds of the treating elements according to the presently disclosed subject matter can facilitate redistribution of channeled liquid streams exiting an upstream processing zone. Said redistributed streams can then enter a downstream processing zone as a laterally dispersed stream which provides improved contact between the stream and the processing zone elements in the downstream processing zone.

It is to be understood that the presently disclosed subject matter is not to be limited to the exact details of construction, operation, exact materials, or embodiments shown and described, as obvious modifications and equivalents will be apparent to one skilled in the art. Accordingly, the presently disclosed subject matter is therefore to be limited only by the scope of the appended claims.

What is claimed is:

1. A method of improving flow distribution of one or more streams in a process vessel comprising:
    passing the one or more streams through an upstream processing zone and a downstream processing zone within the process vessel, the upstream processing zone and downstream processing zone each containing one or more beds of processing materials; and
    passing the one or more streams through a redistribution treating zone located between the upstream processing zone and downstream processing zone, wherein the redistribution treating zone has a depth of four feet or less and contains treating elements and wherein the redistribution treating zone mitigates stream channeling of the streams exiting the upstream processing zone and affects lateral redistribution of the flow of the one or more streams within the downstream processing zone,
    and wherein the process vessel does not utilize a structured, engineered device within the processing vessel adjacent the redistribution treating zone to facilitate flow distribution.

2. The method of claim 1, wherein the redistribution treating zone has a depth of one foot or less.

3. The method of claim 1, wherein the redistribution treating zone has a depth of two feet or less.

4. A method of improving flow distribution of one or more streams in a process vessel comprising:
    passing the one or more streams through an upstream processing zone and a downstream processing zone within the process vessel, the upstream processing zone and downstream processing zone each containing one or more beds of processing materials; and
    passing the one or more streams through a redistribution treating zone located between the upstream processing zone and downstream processing zone, wherein the redistribution treating zone contains a plurality of treating elements and wherein the redistribution treating zone mitigates stream channeling of the streams exiting the upstream processing zone and affects lateral redistribution of the flow of the one or more streams within the downstream processing zone,
    and wherein the process vessel does not utilize a structured, engineered device within the processing vessel adjacent the redistribution treating zone—to facilitate flow distribution,
    and wherein the redistribution treating zone is adjacent to the upstream processing zone and a permeable membrane is disposed between the treating elements in the redistribution treating zone and the processing materials in the upstream processing zone such that the processing materials from the upstream processing zone cannot migrate into the redistribution treating zone but the stream flow may pass through the membrane.

5. A method of improving flow distribution of one or more streams in a process vessel comprising:
    passing the one or more streams through an upstream processing zone and a downstream processing zone within the process vessel, the upstream processing zone and downstream processing zone each containing one or more beds of processing materials; and
    passing the one or more streams through a redistribution treating zone located between the upstream processing zone and downstream processing zone, wherein the redistribution treating zone contains packed treating elements and wherein the redistribution treating zone mitigates stream channeling of the streams exiting the upstream processing zone and affects lateral redistribution of the flow of the one or more streams within the downstream processing zone,
    and wherein no structured, engineered device separates the upper portion of the redistribution treating zone from the lower portion of the upstream processing zone,
    and wherein the redistribution treating zone is directly adjacent to the upstream processing zone and certain of the processing materials from the upstream processing zone are mixed into the redistribution treating zone during loading of the process vessel to create a combo-zone having both processing zone functionality and treating zone functionality.

6. The method of claim 5, wherein the treating elements are individual treating elements.

7. The method of claim 5, wherein the treating elements are randomly-packed treating elements.

8. The method of claim 5, wherein one or more of the treating elements are ceramic reticulates.

9. The method of claim 5, wherein one or more of the treating elements have a quasi ellipsoid shape.

10. The method of claim 5, wherein one or more of the treating elements have a triaxial ellipsoid shape.

11. The method of claim 5, wherein one or more of the treating elements have an oblate spheroid shape.

12. The method of claim 5, wherein one or more of the treating elements have a prolate spheroid shape.

13. The method of claim 5, wherein one or more of the treating elements have a briquette shape.

14. The method of claim 5, wherein one or more of the treating elements have an asymmetrical spheroid shape.

15. The method of claim 5, wherein one or more of the treating elements have an aspherical ellipsoid shape.

16. The method of claim 5, wherein one or more of the treating elements have at least one opening formed therein.

17. The method of claim 5, wherein one or more of the treating elements have at least one opening formed therethrough.

18. The method of claim 5, wherein one or more of the treating elements have one or more asperities formed on the surfaces thereof.

19. The method of claim 18, wherein asperities comprise one or more of flutes, fins, struts, filaments, spikes or hairs.

20. A method of improving flow distribution of one or more streams in a process vessel comprising:
passing the one or more streams through an upstream processing zone and a downstream processing zone within the process vessel, the upstream processing zone and downstream processing zone each containing one or more beds of processing materials; and
passing the one or more streams through a redistribution treating zone located between the upstream processing zone and downstream processing zone, wherein the redistribution treating zone contains packed treating elements and wherein the redistribution treating zone mitigates stream channeling of the streams exiting the upstream processing zone and affects lateral redistribution of the flow of the one or more streams within the downstream processing zone,
and wherein no space between the upstream processing zone and the redistribution treating zone is consumed by a structure internal to the process vessel,
and wherein the redistribution treating zone is directly adjacent to the upstream processing zone and the processing materials in the upstream processing zone are sized such that at least some of the processing materials can migrate into the redistribution treating zone to create a combo-zone having both processing zone functionality and treating zone functionality.

21. The method of claim 5, wherein the processing materials occupy at least 20% of the volume of that portion of the zone of treating elements contained in the redistribution treating zone into which the processing materials are mixed.

22. The method of claim 20, wherein the processing materials occupy at least 20% of the volume of that portion of the zone of treating elements contained in the redistribution treating zone into which the processing materials have migrated.

23. A method of improving flow distribution of one or more streams in a process vessel comprising:
passing the one or more streams through an upstream processing zone and a downstream processing zone within the process vessel, the upstream processing zone and downstream processing zone each containing one or more beds of processing materials; and
passing the one or more streams through a redistribution treating zone located between the upstream processing zone and downstream processing zone, wherein the redistribution treating zone has a depth of four feet or less and contains treating elements and wherein the redistribution treating zone mitigates stream channeling of the streams exiting the upstream processing zone and affects lateral redistribution of the flow of the one or more streams within the downstream processing zone.

24. The method of claim 23, wherein the redistribution treating zone has a depth of one foot or less.

25. The method of claim 23, wherein the redistribution treating zone has a depth of two feet or less.

26. A method of improving flow distribution of one or more streams in a process vessel comprising:
passing the one or more streams through an upstream processing zone and a downstream processing zone within the process vessel, the upstream processing zone and downstream processing zone each containing one or more beds of processing materials; and
passing the one or more streams through a redistribution treating zone located between the upstream processing zone and downstream processing zone, wherein the redistribution treating zone contains a plurality of treating elements and wherein the redistribution treating zone mitigates stream channeling of the streams exiting the upstream processing zone and affects lateral redistribution of the flow of the one or more streams within the downstream processing zone,
and wherein the redistribution treating zone is adjacent to the upstream processing zone and a permeable membrane is disposed between the treating elements in the redistribution treating zone and the processing materials in the upstream processing zone such that the processing materials from the upstream processing zone cannot migrate into the redistribution treating zone but the stream flow may pass through the membrane.

27. A method of improving flow distribution of one or more streams in a process vessel comprising:
passing the one or more streams through an upstream processing zone and a downstream processing zone within the process vessel, the upstream processing zone and downstream processing zone each containing one or more beds of processing materials; and
passing the one or more streams through a redistribution treating zone located between the upstream processing zone and downstream processing zone, wherein the redistribution treating zone contains packed treating elements and wherein the redistribution treating zone mitigates stream channeling of the streams exiting the upstream processing zone and affects lateral redistribution of the flow of the one or more streams within the downstream processing zone,
and wherein the redistribution treating zone is directly adjacent to the upstream processing zone such that certain of the processing materials from the upstream processing zone are capable of migrating into the redistribution treating zone to create a combo-zone having both processing zone functionality and treating zone functionality, and wherein the redistribution treating zone contains a plurality of treating elements.

28. A method of improving flow distribution of one or more streams in a process vessel comprising:
  passing the one or more streams through an upstream processing zone and a downstream processing zone within the process vessel, the upstream processing zone and downstream processing zone each containing one or more beds of processing materials; and
  passing the one or more streams through a redistribution treating zone located between the upstream processing zone and downstream processing zone, wherein the redistribution treating zone contains packed treating elements and wherein the redistribution treating zone mitigates stream channeling of the streams exiting the upstream processing zone and affects lateral redistribution of the flow of the one or more streams within the downstream processing zone,
  and wherein the redistribution treating zone is directly adjacent to the upstream processing zone such that certain of the processing materials from the upstream processing zone are capable of migrating into the redistribution treating zone to create a combo-zone having both processing zone functionality and treating zone functionality,
  and wherein the processing materials occupy at least 20% of the volume of that portion of the layer of treating elements contained in the redistribution treating zone into which the processing materials have migrated.

* * * * *